United States Patent
Karafin et al.

(10) Patent No.: US 10,551,628 B2
(45) Date of Patent: Feb. 4, 2020

(54) HIGH-DENSITY ENERGY DIRECTING DEVICES FOR TWO-DIMENSIONAL, STEREOSCOPIC, LIGHT FIELD AND HOLOGRAPHIC HEAD-MOUNTED

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: LIGHT FIELD LAB, INC., San Jose, CA (US)

( * ) Notice: Subject to any disclaimer, the term of this patent is extended or adjusted under 35 U.S.C. 154(b) by 49 days.

(21) Appl. No.: 16/063,976

(22) PCT Filed: Jul. 17, 2017

(86) PCT No.: PCT/US2017/042466
§ 371 (c)(1),
(2) Date: Jun. 19, 2018

(87) PCT Pub. No.: WO2018/014044
PCT Pub. Date: Jan. 18, 2018

(65) Prior Publication Data
US 2019/0361253 A1  Nov. 28, 2019

Related U.S. Application Data
(60) Provisional application No. 62/362,602, filed on Jul. 15, 2016, provisional application No. 62/366,076, (Continued)

(51) Int. Cl.
*G02B 27/01* (2006.01)
*G02B 27/22* (2018.01)
(Continued)

(52) U.S. Cl.
CPC ............... *G02B 27/22* (2013.01); *G02B 5/32* (2013.01); *G02B 27/0103* (2013.01);
(Continued)

(58) Field of Classification Search
CPC ...... G02B 27/22; G02B 5/32; G02B 27/0172; G02B 27/0103
See application file for complete search history.

(56) References Cited

U.S. PATENT DOCUMENTS

| 5,374,975 A | 12/1994 | Spannenburg |
| 5,374,976 A | 12/1994 | Spannenburg |

(Continued)

FOREIGN PATENT DOCUMENTS

| WO | 2014188149 | 11/2014 |
| WO | 2016046514 | 3/2016 |

OTHER PUBLICATIONS

International Search Report and Written Opinion dated Nov. 28, 2017 of International Patent Application No. PCT/US17/42466.
(Continued)

*Primary Examiner* — Joseph P Martinez
(74) *Attorney, Agent, or Firm* — Burke, Williams & Sorensen, LLP

(57) ABSTRACT

Disclosed are high-density energy directing devices and systems thereof for two-dimensional, stereoscopic, light field and holographic head-mounted displays. In general, the head-mounted display system includes one or more energy devices and one or more energy relay elements, each energy relay element having a first surface and a second surface. The first surface is disposed in energy propagation paths of the one or more energy devices and the second surface of each of the one or more energy relay elements is arranged to form a singular seamless energy surface. A separation between edges of any two adjacent second surfaces is less (Continued)

than a minimum perceptible contour as defined by the visual acuity of a human eye having better than 20/40 vision at a distance from the singular seamless energy surface, the distance being greater than the lesser of: half of a height of the singular seamless energy surface, or half of a width of the singular seamless energy surface.

35 Claims, 10 Drawing Sheets

Related U.S. Application Data filed on Jul. 24, 2016, provisional application No. 62/507,500, filed on May 17, 2017.

(51) Int. Cl.
| | | |
|---|---|---|
| *G06F 3/01* | (2006.01) | |
| *H04N 5/89* | (2006.01) | |
| *G02B 5/32* | (2006.01) | |

(52) U.S. Cl.
CPC ........... *G02B 27/0172* (2013.01); *G06F 3/01* (2013.01); *H04N 5/89* (2013.01)

(56) References Cited

U.S. PATENT DOCUMENTS

| | | | |
|---|---|---|---|
| 5,481,385 A | 1/1996 | Zimmerman et al. | |
| 6,680,761 B1 * | 1/2004 | Greene | G02F 1/13336 |
| | | | 349/153 |
| 7,329,982 B2 | 2/2008 | Conner et al. | |
| 8,369,546 B2 | 2/2013 | Pompei | |
| 8,743,466 B2 | 6/2014 | Yamamoto | |
| 8,879,766 B1 | 11/2014 | Zhang | |
| 9,411,511 B1 | 8/2016 | Sivertsen | |
| 2003/0030912 A1 | 2/2003 | Gleckman et al. | |
| 2004/0135100 A1 | 7/2004 | Menon et al. | |
| 2004/0108806 A1 | 10/2004 | Cok et al. | |
| 2005/0119575 A1 | 6/2005 | Ladabaum et al. | |
| 2006/0191566 A1 | 8/2006 | Schaffsma | |
| 2007/0091638 A1 | 4/2007 | Ijzerman et al. | |
| 2008/0035834 A1 | 2/2008 | Gleckler | |
| 2008/0192313 A1 | 8/2008 | Matsumura et al. | |
| 2009/0235750 A1 | 9/2009 | Chang | |
| 2009/0247305 A1 | 10/2009 | Kanekal | |
| 2009/0273575 A1 | 11/2009 | Pryor | |
| 2010/0245824 A1 | 9/2010 | Schwarz | |
| 2010/0278480 A1 | 11/2010 | Vasylyev | |
| 2012/0206390 A1 | 8/2012 | Ueno et al. | |
| 2012/0206726 A1 | 8/2012 | Pervez et al. | |
| 2012/0268950 A1 | 10/2012 | Parkyn et al. | |
| 2012/0300044 A1 | 11/2012 | Thomas et al. | |
| 2013/0127832 A1 | 5/2013 | Lee | |
| 2013/0163089 A1 | 6/2013 | Bohn | |
| 2013/0195410 A1 | 8/2013 | Karbasivalashani et al. | |
| 2013/0265485 A1 | 10/2013 | Kang | |
| 2014/0043370 A1 | 2/2014 | Payne et al. | |
| 2014/0072141 A1 | 3/2014 | Cohen | |
| 2014/0126322 A1 | 5/2014 | Cipolla et al. | |
| 2014/0132694 A1 | 5/2014 | Shacham et al. | |
| 2014/0253613 A1 | 9/2014 | Gilbert | |
| 2014/0371353 A1 | 12/2014 | Mitchel et al. | |
| 2015/0007025 A1 | 1/2015 | Sassi | |
| 2015/0022754 A1 | 1/2015 | Jepsen | |
| 2015/0185841 A1 | 7/2015 | Levesque | |
| 2015/0192995 A1 | 7/2015 | Subramanian | |
| 2015/0219940 A1 | 8/2015 | Kim et al. | |
| 2015/0277378 A1 | 10/2015 | Smithwick | |
| 2016/0070059 A1 | 3/2016 | Chen et al. | |
| 2016/0180511 A1 | 6/2016 | Zhou et al. | |
| 2016/0205394 A1 | 7/2016 | Meng et al. | |
| 2016/0223988 A1 | 8/2016 | Bove | |

OTHER PUBLICATIONS

International Search Report and Written Opinion of PCT/US17/42452 dated Nov. 17, 2017.
International Search Report and Written Opinion of PCT/US17/42275 dated Dec. 4, 2017.
International Search Report and Written Opinion of PCT/US17/42468 dated Nov. 27, 2017.
International Search Report and Written Opinion of PCT/US17/42470 dated Dec. 28, 2017.
International Search Report and Written Opinion of PCT/US17/42418 dated Dec. 20, 2017.
International Search Report and Written Opinion of PCT/US17/42467 dated Dec. 27, 2017.
International Search Report and Written Opinion of PCT/US2017/042466 dated Nov. 28, 2017.
International Search Report and Written Opinion of PCT/US2016/23753 dated Jul. 15, 2016.

* cited by examiner

HIGH-DENSITY ENERGY DIRECTING DEVICES FOR TWO-DIMENSIONAL, STEREOSCOPIC, LIGHT FIELD AND HOLOGRAPHIC HEAD-MOUNTED

TECHNICAL FIELD

This disclosure generally relates to head-mounted displays, and more specifically, to high-density energy directing devices for two-dimensional, stereoscopic, light field and holographic head-mounted displays.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

Disclosed are high-density energy directing devices and systems thereof for two-dimensional, stereoscopic, light field and holographic head-mounted displays.

In one embodiment, a head-mounted display system includes: one or more energy devices; one or more energy relay elements, each having a first surface and a second surface, where the first surface is disposed in energy propagation paths of the one or more energy devices; where the second surface of each of the one or more energy relay elements is arranged to form a singular seamless energy surface; where a separation between edges of any two adjacent second surfaces is less than a minimum perceptible contour as defined by the visual acuity of a human eye having better than 20/40 vision at a distance from the singular seamless energy surface, the distance being greater than the lesser of: half of a height of the singular seamless energy surface, or half of a width of the singular seamless energy surface; where a first aperture has a first field of view on the singular seamless energy surface, and a second aperture has a second field of view on the singular seamless energy surface, the first and second fields of view overlapping in a first region; and an energy inhibiting element configured to substantially allows energy to propagate through only one of the first and second apertures.

In one embodiment, each of the one or more energy relay elements includes a flexible waveguide configured to provide magnified optics or minified optics. In some embodiments, each of the second surfaces of the one or more energy relay elements can be flat, curved, faceted, or non-uniform.

In another embodiment, the one or more energy devices include a first energy device and a second energy device, where both of the first energy device and the second energy device include displays, and where the system further comprises an energy combining element configured to relay energy between each of the first energy device and the second energy device, and the first surface of the energy relay element.

In another embodiment, the one or more energy devices include a first energy device and a second energy device, where both of the first energy device and the second energy device include energy sensing devices, and where the system further comprises an energy combining element configured to relay energy between each of the first energy device and the second energy device, and the first surface of the energy relay element.

In another embodiment, the one or more energy devices include a first energy device and a second energy device, where the first energy device includes a display and the second energy device include an energy sensing device, and where the system further comprises an energy combining element configured to relay energy between each of the first energy device and the second energy device, and the first surface of the energy relay element.

In one embodiment, the system further includes an additional waveguide element configured to substantially alter the direction of energy to propagate through the first aperture, the second aperture, or both the first and second apertures.

In some embodiments, the additional waveguide element includes a dioptric adjustment optics that increases the first field of view, the second field of view, or both the first and second fields of view.

In one embodiment, the system further includes an energy combining element having first and second input surfaces, the first input surface disposed in energy propagation paths of the single seamless energy surface and the second input surface disposed in energy propagation paths of an additional energy source.

In some embodiments, the energy combining element is configured to combine energy propagating through the first and second input surfaces and output the combined energy through an output surface of the energy combining element.

In other embodiments, the energy combining element can be a polarizing beam splitter, a prism or a dichoric film.

In some embodiments, the additional energy source includes at least one of a portion of ambient energy, energy from the one or more energy devices, energy from non-energy devices, and energy outside of the system.

In one embodiment, each of the one or more energy relay elements includes first and second structures, the first structure having a first refractive index and a first engineered property, the second structure having a second refractive index and a second engineered property, and where each of the one or more energy relay elements includes randomized refractive index variability of the first refractive index and the second refractive index, and randomized engineering properties of the first engineered property and the second engineered property such that energy propagating therethrough have higher transport efficiency in a longitudinal orientation versus a transverse orientation due to the randomized refractive index variability and the randomized engineering properties.

In one embodiment, a head-mounted display system includes: an energy assembly having at least one energy device; and a relay assembly having: at least one energy relay element, the energy relay element having first and second structures, the first structure having a first refractive index and a first engineered property, the second structure having a second refractive index and a second engineered property, the energy relay element having randomized refractive index variability of the first refractive index and the second refractive index, and randomized engineering properties of the first engineered property and the second engineered property such that energy propagating therethrough have higher transport efficiency in a longitudinal orientation versus a transverse orientation due to the randomized refractive index variability and the randomized engineering properties; and where the energy relay element is configured to direct energy along energy propagation paths between a surface of the energy relay element and the energy device.

In another embodiment, the energy relay element includes a flexible waveguide configured to provide magnified optics or minified optics. In some embodiments, the energy relay element can be flat, curved, faceted, or non-uniform. In other embodiments, the energy assembly includes a first energy device and a second energy device spaced from each other, the relay assembly includes a first energy relay element and a second energy relay element spaced from each other, where the first energy relay element is configured to direct energy along a first energy propagation path between a first surface of the first energy relay element and the first energy device, and where the second energy relay element is configured to direct energy along a second energy propagation path between a first surface of the second energy relay element and the second energy device.

In one embodiment, both of the first energy device and the second energy device include displays, and where the system further comprises an energy combining element configured to relay energy between the first surface of the first energy relay element and the first energy device, and the first surface of the second energy relay element and the second energy device.

In another embodiment, both of the first energy device and the second energy device include energy sensing devices, and where the system further comprises an energy combining element configured to relay energy between the first surface of the first energy relay element and the first energy device, and the first surface of the second energy relay element and the second energy device.

In yet another embodiment the first energy device includes a display and the second energy device includes an energy sensing device, and where the system further comprises an energy combining element configured to relay energy between the first surface of the first energy relay element and the first energy device, and the first surface of the second energy relay element and the second energy device.

In one embodiment, the system further includes an additional waveguide element configured to substantially alter the direction of energy along an alternate energy propagation path.

In another embodiment, the additional waveguide element includes a dioptric adjustment optic that increases a field of view of the energy along the energy propagation path.

In another embodiment, the system further includes an energy combining element having first and second input surfaces, the first input surface disposed in the energy propagation path between the surface of the energy relay element and the energy device, and the second input surface disposed in additional energy propagation path of an additional energy source.

In one embodiment, the energy combining element is configured to combine energy propagating through the first and second input surfaces and output the combined energy through an output surface of the energy combining element.

In another embodiment, the energy combining element can be a polarizing beam splitter, a prism or a dichoric film.

In some embodiments, the additional energy source includes at least a portion of ambient energy, energy from the at least one energy device, energy from non-energy devices, and energy outside of the system.

In one embodiment, a head-mounted display system includes: one or more energy devices; one or more energy relay elements, each having a first surface and a second surface, where the first surface is disposed in energy propagation paths of the one or more energy devices; where the second surface of each of the one or more energy relay elements is arranged to form a singular seamless energy surface; where a separation between edges of any two adjacent second surfaces is less than a minimum perceptible contour as defined by the visual acuity of a human eye having better than 20/40 vision at a distance from the singular seamless energy surface, the distance being greater than the lesser of: half of a height of the singular seamless energy surface, or half of a width of the singular seamless energy surface; where a first aperture has a first field of view on the singular seamless energy surface, and a second aperture has a second field of view on the singular seamless energy surface, the first and second fields of view overlapping in a first region. In this embodiment, the system also includes an energy inhibiting element configured to substantially allow energy to propagate through only one of the first and second apertures; and an energy combining element having first and second input surfaces, the first input surface disposed in the energy propagation paths of the single seamless energy surface and the second input surface disposed in energy propagation paths of an additional energy source.

In another embodiment, each of the one or more energy relay elements includes a flexible waveguide configured to provide magnified optics or minified optics.

In another embodiment, each of the second surfaces of the one or more energy relay elements can be flat, curved, faceted, or non-uniform.

In some embodiments, the one or more energy devices include a first energy device and a second energy device, where both of the first energy device and the second energy device include displays, and where the system further comprises an energy combining element configured to relay energy between each of the first energy device and the second energy device, and the first surface of the energy relay element.

In other embodiments, the one or more energy devices include a first energy device and a second energy device, where both of the first energy device and the second energy device include energy sensing devices, and where the system further comprises an energy combining element configured to relay energy between each of the first energy device and the second energy device, and the first surface of the energy relay element.

In some embodiments, the one or more energy devices include a first energy device and a second energy device, where the first energy device includes a display and the second energy device include an energy sensing device, and where the system further comprises an energy combining element configured to relay energy between each of the first energy device and the second energy device, and the first surface of the energy relay element.

In one embodiment, the system further includes an additional waveguide element configured to substantially alter the direction of energy to propagate through the first aperture, the second aperture, or both the first and second apertures.

In some embodiments, the additional waveguide element includes a dioptric adjustment optics that increases the first field of view, the second field of view, or both the first and second fields of view.

In one embodiment, the energy combining element is configured to combine energy propagating through the first and second input surfaces and output the combined energy through an output surface of the energy combining element.

In some embodiments, the energy combining element can be a polarizing beam splitter, a prism or a dichoric film.

In other embodiments, the additional energy source includes at least one of a portion of ambient energy, energy from the one or more energy devices, energy from non-energy devices, and energy outside of the system.

In some embodiments, each of the one or more energy relay elements includes first and second structures, the first structure having a first refractive index and a first engineered property, the second structure having a second refractive index and a second engineered property, and where each of the one or more energy relay elements includes randomized refractive index variability of the first refractive index and the second refractive index, and randomized engineering properties of the first engineered property and the second engineered property such that energy propagating therethrough have higher transport efficiency in a longitudinal orientation versus a transverse orientation due to the randomized refractive index variability and the randomized engineering properties.

In one embodiment, the system further includes an array of energy waveguides configured to direct energy therethrough along the energy propagation paths, where the energy waveguides of the array are located at different spatial coordinates, and each energy waveguide directs energy from the respective spatial coordinate to the energy propagation paths along different directions according to a 4D plenoptic function.

In another embodiment, the system further includes an energy modulation element disposed between the energy combining element and the single seamless energy surface, the energy modulation element configured to modulate energy passing therethrough.

These and other advantages of the present disclosure will become apparent to those skilled in the art from the following detailed description and the appended claims.

DETAILED DESCRIPTION

Figure 1:
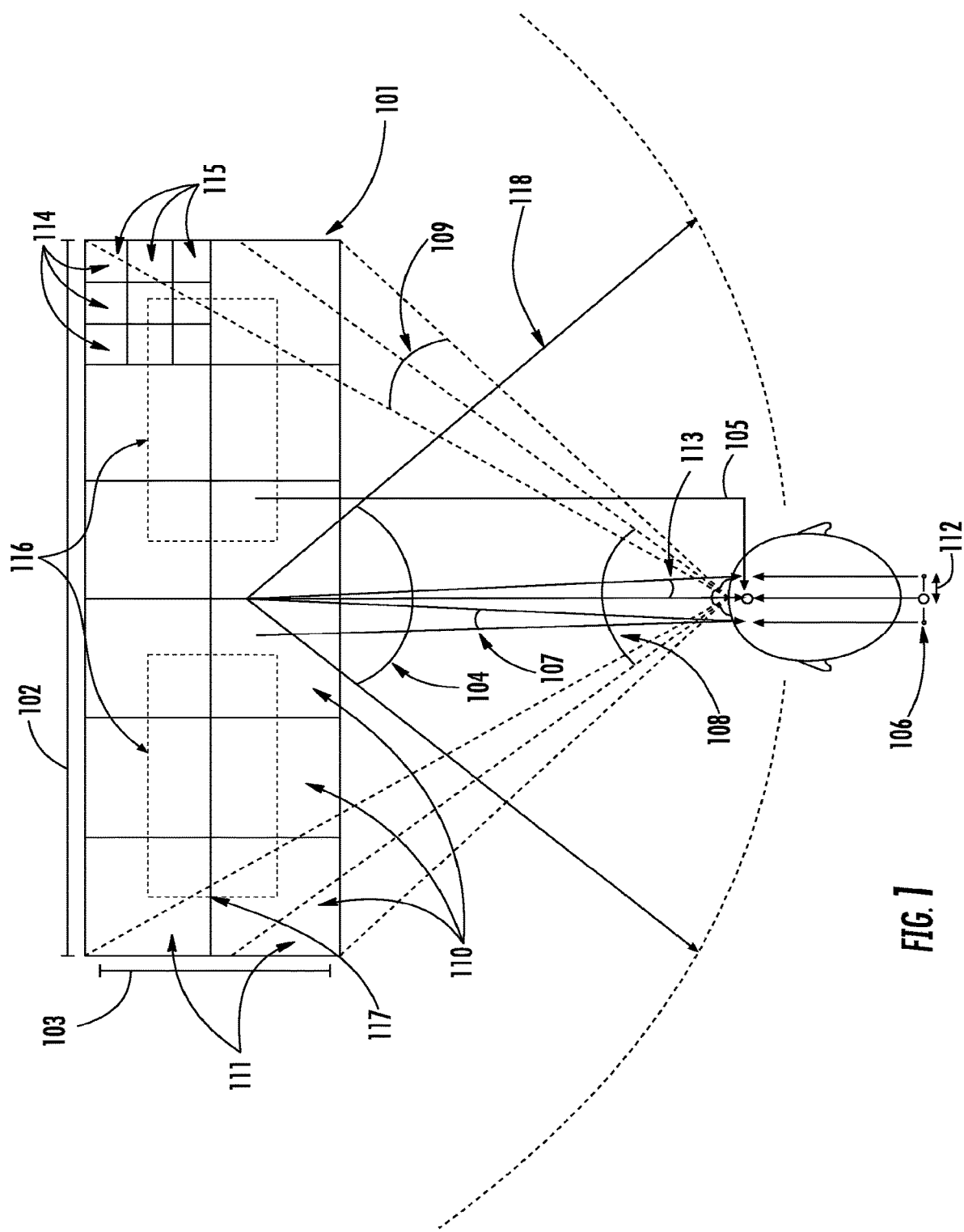
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of energy and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory system at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bi-directional energy surface architecture, all components may be configured to form the appropriate structures for any energy domain to enable holographic propagation.

However, the main challenge to enable the Holodeck today involves available visual technologies and energy device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not be practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{\text{Width}(W)}{\text{Height}(H)}$$

$$\text{Surface Horizontal Size} = \text{Surface Diagonal} * \left( \frac{1}{\sqrt{1 + \left(\frac{H}{W}\right)^2}} \right)$$

$$\text{Surface Vertical Size} = \text{Surface Diagonal} * \left( \frac{1}{\sqrt{1 + \left(\frac{W}{H}\right)^2}} \right)$$

$$\text{Horizontal Field of View} = 2 * \text{atan}\left( \frac{\text{Surface Horizontal Size}}{2 * \text{Seating Distance}} \right)$$

$$\text{Vertical Field of View} = 2 * \text{atan}\left( \frac{\text{Surface Vertical Size}}{2 * \text{Seating Distance}} \right)$$

$$\text{Horizontal Element Resolution} = \text{Horizontal } FoV * \frac{60}{\text{Eye Resolution}}$$

$$\text{Vertical Element Resolution} = \text{Vertical } FoV * \frac{60}{\text{Eye Resolution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter-Ocular Distance}}{(\text{Number of Desired Intermediate Samples} + 1)}$$

$$\text{Angular Sampling} = \text{atan}\left( \frac{\text{Sample Distance}}{\text{Seating Distance}} \right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element}(N) = \frac{\text{Seating } FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
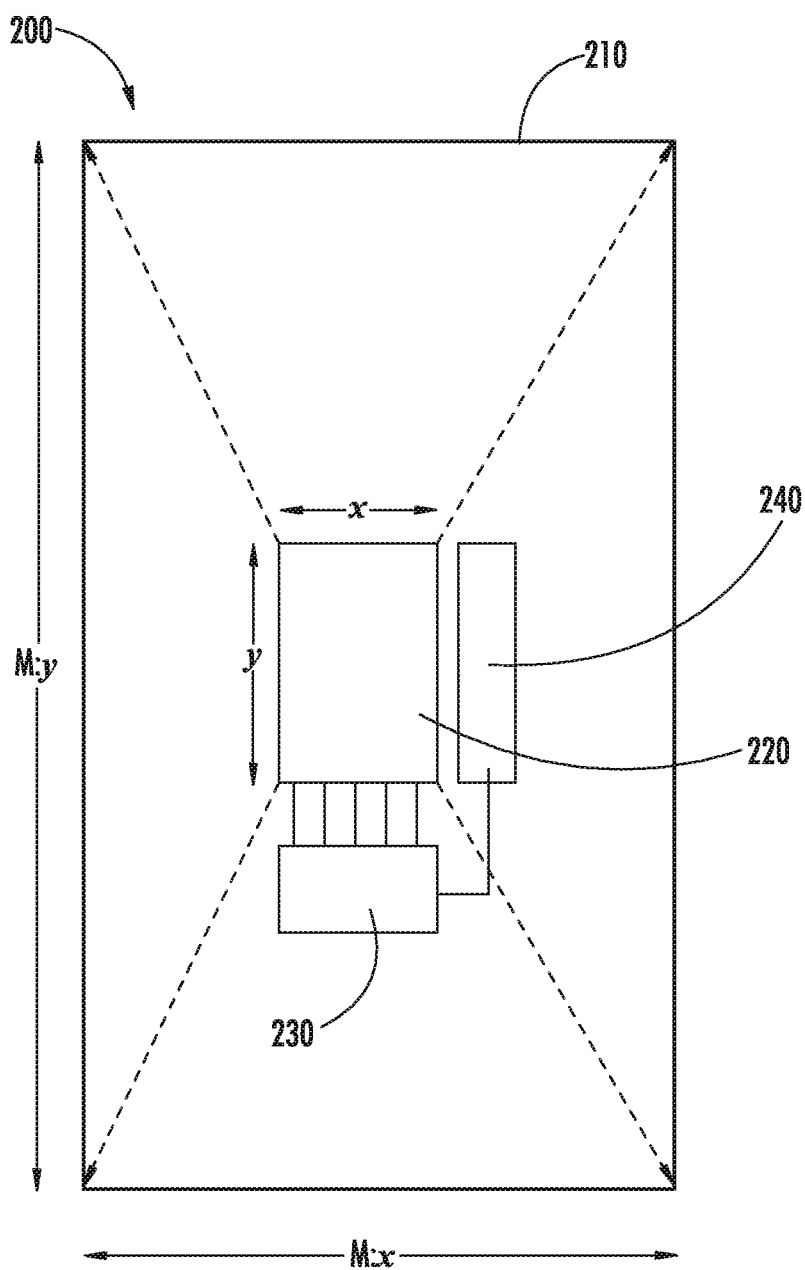
FIG. 2 is a schematic diagram illustrating an energy system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices consist of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase the effective size of the active device area to meet or exceed the mechanical dimensions to configure an array of relays and form a singular seamless energy surface.

Figure 3:
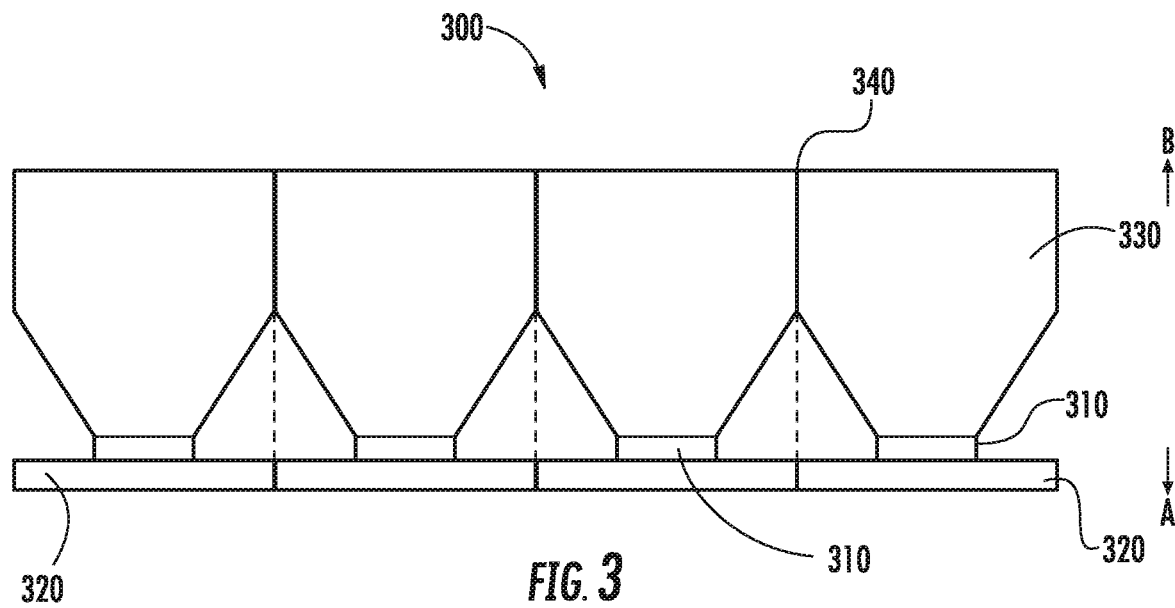
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figure 4:
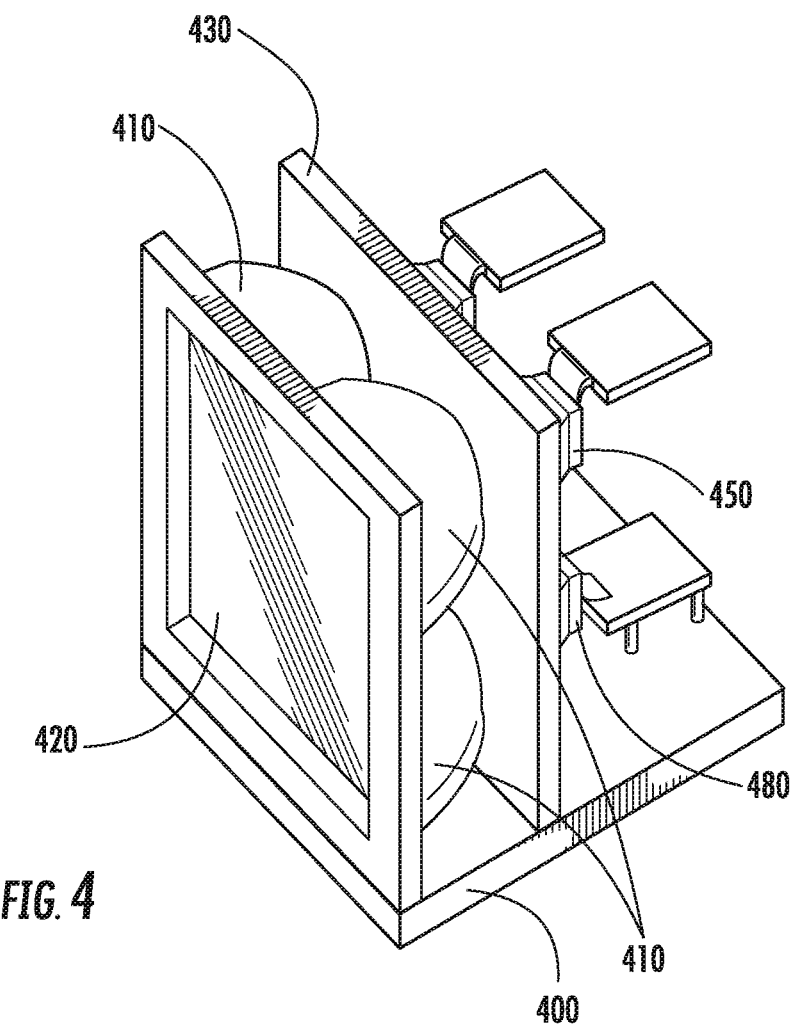
FIG. 4 is a schematic diagram illustrating an embodiment of energy relay elements adhered together and fastened to a base structure.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless energy surface directing energy along propagation paths extending between one or more energy locations and the seamless energy surface, and where the separation between the edges of any two adjacent second sides of the terminal energy relay elements is less than the minimum perceptible contour as defined by the visual acuity of a human eye having better than 20/40 vision at a distance greater than the width of the singular seamless energy surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10 degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bi-directional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

Figure 5A:
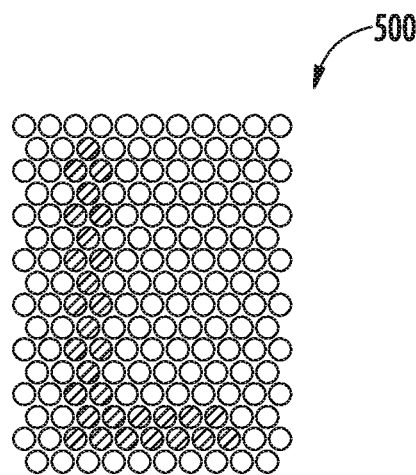
FIG. 5A is a schematic diagram illustrating an example of a relayed image through multi-core optical fibers.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 3.

Figure 5B:
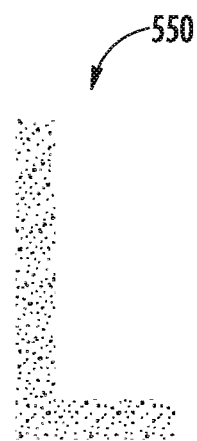
FIG. 5B is a schematic diagram illustrating an example of a relayed image through an optical relay that exhibits the properties of the Transverse Anderson Localization principle.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

There is significant advantage to the Transverse Anderson Localization material properties in terms of both cost and weight, where a similar optical grade glass material, may cost and weigh upwards of 10 to 100-fold more than the cost for the same material generated within an embodiment, wherein disclosed systems and methods comprise randomized microscopic component engineered structures demonstrating significant opportunities to improve both cost and quality over other technologies known in the art.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein localized energy waves propagating through the energy relay have higher transport efficiency in the longitudinal orientation versus the transverse orientation.

In an embodiment, multiple energy domains may be configured within a single, or between multiple Transverse Anderson Localization energy relays to direct one or more sensory holographic energy propagation paths including visual, acoustic, tactile or other energy domains.

In an embodiment, the seamless energy surface is configured with Transverse Anderson Localization energy relays that comprise two or more first sides for each second side to both receive and emit one or more energy domains simultaneously to provide bi-directional energy propagation throughout the system.

In an embodiment, the Transverse Anderson Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function.

Figure 6:
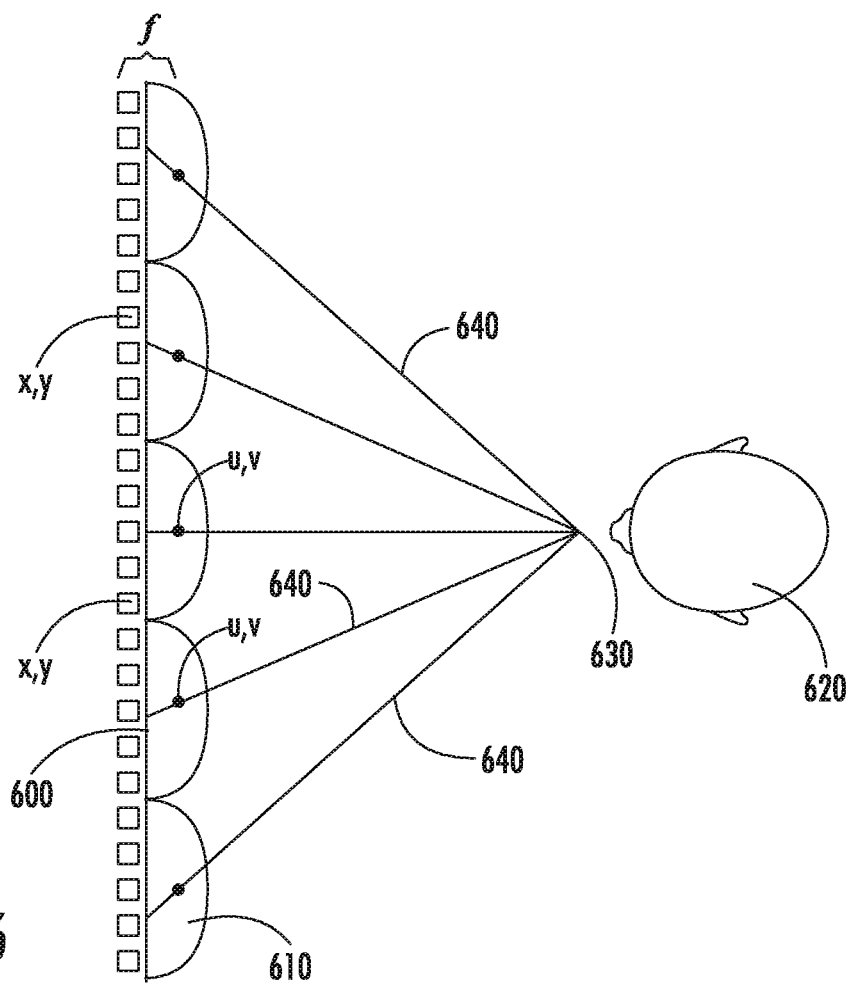
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due designs that have not accurately accounted for any of diffraction, scatter, diffusion, angular direction, calibration, focus, collimation, curvature, uniformity, element cross-talk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bi-directional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Bi-Directional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bi-directional holographic energy propagation, emission, reflection, or sensing.

In an embodiment, an environment of tiled seamless energy systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregates tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bi-directionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bi-directional energy propagation and aggregated surfaces are possible.

In an embodiment, the system comprises an energy waveguide capable of bi-directional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bi-directional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bi-directional captured data and projection information.

In some embodiments, a plurality of combinations of three energy devices comprising an ultrasonic sensor, a visible energy display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bi-directional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Head Mounted Displays

In general, virtual reality (VR) and augmented reality (AR) devices require very high resolution for standard stereoscopic viewing in order to exceed the resolution limits of the eye and state of the art displays have yet to produce sufficient resolution. Part of the challenge in a design for VR and AR is the amount of data that would need to be transmitted to a headset, and the physical size and weight of higher resolution displays. An additional challenge for both technologies involves the widest possible field of view (FOV) where most have less than 60 degrees of FOV per eye and may not be sufficient depending on the applications involved.

When light field or holographic imaging is involved, the resolution requirements continue to increase by potentially multiple magnitudes. There are companies claiming to produce light fields for VR and AR displays, but at the time of this filing, those are believed to be stereoscopic displays with variable optics and associated processors and not true light field or holographic imaging.

Disclosed embodiments can be leveraged to produce lightweight, wide field of view and extremely high-resolution 2D, stereoscopic and/or light field VR or AR HMD's.

In the most simplistic implementation, a high-resolution seamless energy surface can be produced in combination with dioptric adjustment optics to reimage the projected energy surface onto the viewer's natural plane of focus for traditional 2D or stereoscopic VR applications. The display size and resolution may be adjusted accordingly to map the FOV to exceed the viewer's maximum periphery, and may be constructed with a density that meets and/or exceeds the resolution limits of the eye. The proposed implementation may incorporate non-planar surfaces and other relay elements to produce seamless curved surfaces, decrease weight, increase available view angles, or increase modulation transfer function (MTF) in addition to multiple other potential applications. In this fashion, a wrap-around monoscopic or stereoscopic energy surface may be produced as shown in FIG. 7.

Figure 7:
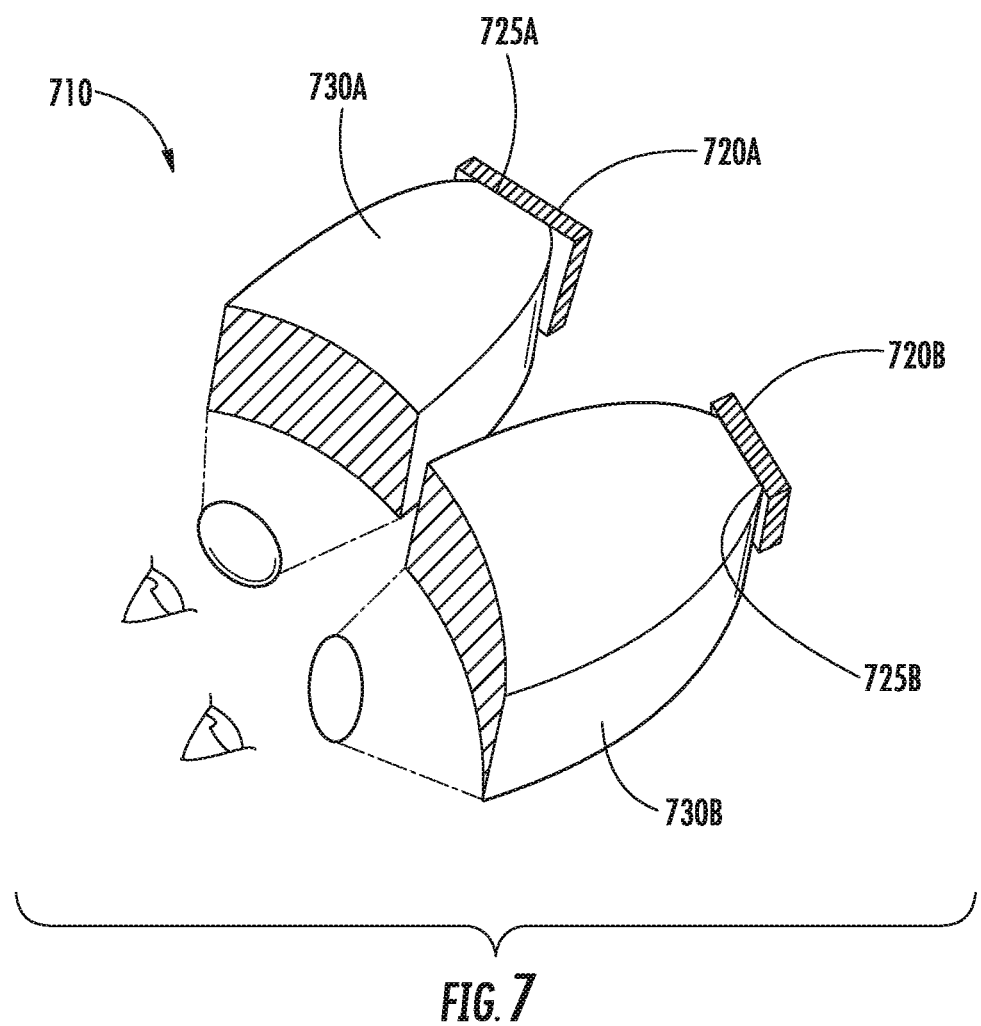
FIG. 7 illustrates an embodiment of two displays that exceed the field of view (FOV) of the viewer and provides higher resolution than possible with other contemporary technologies, in accordance with one embodiment of the present disclosure.
Figure 9:
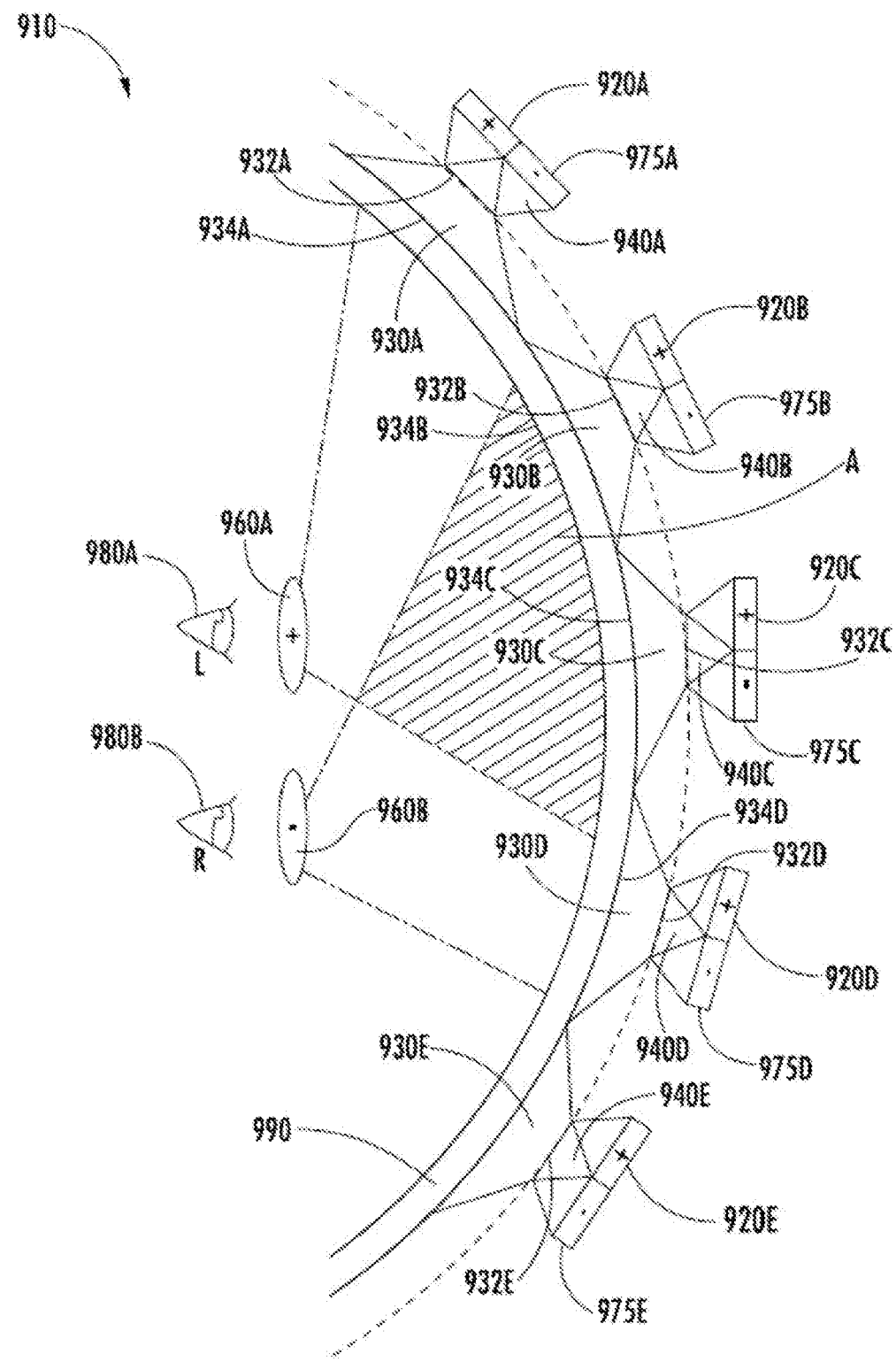
FIG. 9 illustrates a system having an energy assembly having a plurality of energy devices and a relay element, in accordance with one embodiment of the present disclosure.

FIG. 7 illustrates an embodiment of two displays with a concave cylindrical surface shape that exceed the FOV of the viewer and provides higher resolution than possible with other contemporary technologies. In an additional embodiment, rather than limiting the left and right eye FOV with a barrier as is common in most displays today, a time sequential active and/or passive polarization system may be integrated to provide a singular contiguous curved display without the limitation of per eye FOV as shown in FIG. 9.

Figure 8:
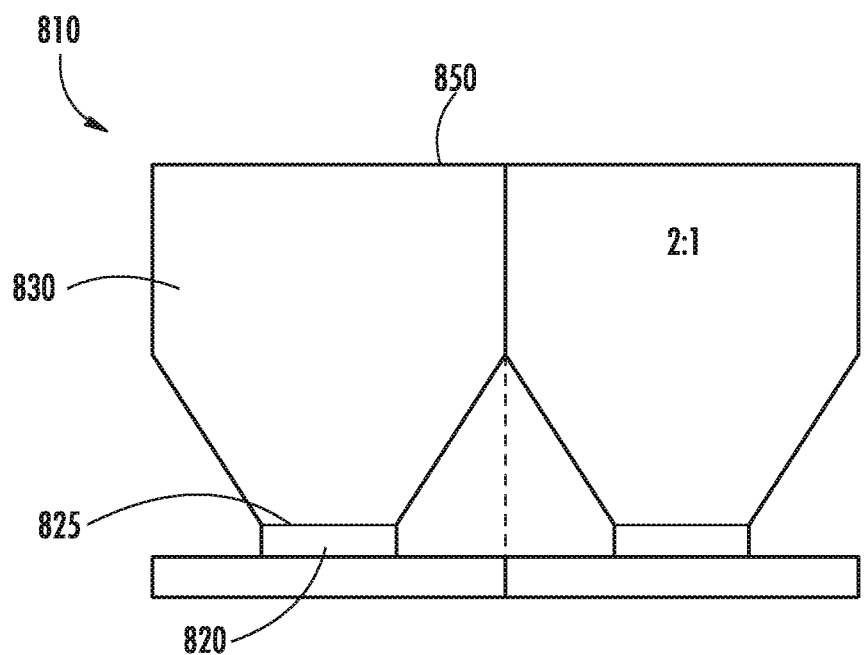
FIG. 8 illustrates a system having an energy assembly having at least one energy device, in accordance with one embodiment of the present disclosure.

FIG. 8 illustrates a tapered energy relay mosaic 810 having two tapered energy relays 830. In this embodiment, each energy relay element 830 is configured to propagate the energy from energy source 820 from the first relay surface 825 to the second common energy surface 850. In one embodiment, the energy relay element 830 includes a flexible waveguide configured to provide magnified optics or minified optics. In another embodiment, the energy relay element 830 can be flat, curved, faceted, or non-uniform.

In some embodiments, randomized refractive index variability in the transverse orientation coupled with minimal refractive index variation in the longitudinal orientation results in energy waves having substantially higher transport efficiency along the longitudinal orientation, and spatial localization along the transverse orientation of energy relay 830. In other embodiments where the relay 830 is constructed of multicore fiber, the energy waves propagating within each relay element may travel in the longitudinal orientation determined by the alignment of fibers in this orientation.

Returning now to FIG. 7, one embodiment discloses a system having an energy assembly 710 having a first energy device 720A and a second energy device 720B spaced from each other. The energy assembly 710 includes a first tapered energy relay element 730A and a second tapered energy relay element 730B spaced from each other. In one embodiment, energy emitted from the energy device 720A propagates from the first surface 725A to the curved second surface formed by the relay element 730A. In another embodiment, energy emitted from the energy device 720B propagates from the first surface 725B to the curved second surface formed by the relay element 730B.

In one embodiment, each of the energy relay elements 730A, 730B has randomized refractive index variability in the transverse orientation coupled with minimal refractive index variation in the longitudinal orientation, resulting in energy waves having substantially higher transport efficiency along the longitudinal orientation, and spatial localization along the transverse orientation. In other embodiments where the relays 730A and 730B are constructed of multicore fiber, the energy waves propagating within each relay element may travel in the longitudinal orientation determined by the alignment of fibers in this orientation. In some embodiments, each of the energy relay elements 730A, 730B includes a flexible waveguide configured to provide magnified optics or minified optics. In another embodiment, each of the energy relay elements 730A, 730B can be flat, curved, faceted, or non-uniform.

An energy combiner can be placed between each of the energy devices 720A, 720B, and the first surface of its respective energy relay 725A, 725B. In one embodiment, both energy devices are displays. In another embodiment, both energy devices are sensing devices. In a different embodiment, one of the energy devices is a display, and the other is an imaging sensor. These will be described in more detail below in subsequent figures and discussion.

In some embodiments, each of the systems disclosed in FIGS. 7 and 8 may further include an additional waveguide element such as a lens to substantially change the direction of energy along an alternate energy propagation path. The additional waveguide element may be placed in front of the energy relay, disposed between the energy relay element and the energy device, after the energy device, or anywhere throughout the system to substantially alter the direction of energy along an energy propagation path. In some embodiments, the additional waveguide element includes a dioptric adjustment optics that increases a field of view along the energy propagation path.

In some embodiments, it may be possible to split each energy surface path into two separate interlaced polarized paths with a relay element image combiner where the pixel density at the energy surface will result in interlacing that may be difficult to detect with the eye due to the random nature of the interlacing structure and the ability to now directly polarize each display discreetly. The display itself may be polarized with a film, coating, material, or the like and the optical fibers maintain polarization states through to the energy surface. The dioptric lens elements may then have passive polarization implemented such that each eye will only see a singular portion of the energy surface that is ultimately producing an extremely high resolution left eye and right eye independent viewpoint without limiting the FOV in any way. An additional benefit of this approach is not requiring time sequential stereoscopic imaging which may be known to cause temporal stereoscopic artifacts and require a much higher frequency display as not to induce motion sickness when switching between alternating viewpoints.

In other embodiments, the system further includes an energy combining element having first and second input surfaces, the first input surface disposed in the energy propagation path between the surface of the energy relay element and the energy device, and the second input surface disposed in additional energy propagation path of an additional energy source. This will be described in more detail in subsequent discussion.

In one embodiment, the energy combining element is configured to combine energy propagating through the first and second input surfaces and output the combined energy through an output surface of the energy combining element. In some embodiments, the energy combining element can be a polarizing beam splitter, a prism or a dichoric film. In other embodiments, the additional energy source includes at least a portion of ambient energy, energy from the at least one energy device, energy from non-energy devices, and energy outside of the system.

In one embodiment, a system may include first energy device and second energy device spaced from each other, where each of the first energy device and the second energy device includes a first surface and a second surface, respectively. In this embodiment, the system may further include first energy relay element and second energy relay element spaced from each other, where each of the first energy relay element and the second energy relay element includes a first surface and a second surface, respectively. The first energy device may be coupled to the first energy relay element, and the second energy device may be coupled to the second energy relay element. In operation, the first energy relay element is configured to propagate energy between the first surface of the first energy device and the second surface of the first relay element, and the second energy relay element is configured to propagate the energy between the first surface of the second energy device and the second surface of the second relay element.

In another embodiment, each of the first energy relay element and the second energy relay element includes a flexible waveguide configured to provide magnified optics or minified optics. In some embodiments, each of the first energy relay element and the second energy relay element is composed of two or more energy relays in series, including tapered optical relays with spatial magnification, tapered optical relays with spatial de-magnification, coherent optical relays, flexible optical relays, and faceplates. In other embodiments, the first surfaces and the second surfaces of the first energy relay element and the second energy relay elements can be flat, curved, faceted, or non-uniform.

In one embodiment, the system further includes additional waveguide elements in front of each of the second surface of the first energy relay element and the second surface of the second energy relay, each of the additional waveguide elements configured to substantially alter the direction of energy along an alternate energy path. In these embodiments, the additional waveguide elements include dioptric adjustment optics that increases a field of view of the energy along the energy propagation path.

In one embodiment, the first energy device may be coupled to the first relay through a first energy combining element, and the second energy device may be coupled to the second relay through a second energy combining element. In some embodiments, each of the first energy combining element and the second energy combining element can be a polarizing beam splitter, a prism or a dichoric film.

In one embodiment, the system further includes a first display device disposed on the first energy combining element and a second display device disposed on the second energy combining element. In another embodiment, the system further includes a first sensor disposed on the first energy combining element and a second sensor disposed on the second energy combining element. In one embodiment, the first energy combining element is configured to combine the energy from the first energy device and energy from an additional source external to the system. In another embodiment, the second energy combining element is configured to combine the energy from the second energy device and energy from an additional source external to the system.

FIG. 9 illustrates a system having an energy assembly 910 having a plurality of energy devices 920 and relay elements 930. In operation, this design leverages a curved semi-spherical surface, producing discreetly generated and directly polarized stereoscopic views from within the same pixel structure.

In one embodiment, the system includes one or more energy devices 920A, 920B, 920C, 920D, 920E and one or more energy relay elements 930A, 930B, 930C, 930D, 930E. Each of the energy relay elements 930A-930E includes a first surface 932A, 932B, 932C, 932D, 932E and a second surface 934A, 934B, 934C, 934D, 934E, where the first surface 932A-932E is disposed in energy propagation paths of the one or more energy devices 920A-920E.

The second surface 934A-934E of each of the one or more energy relay elements 930A-930E may be arranged to form a singular seamless energy surface 990. In some embodiments, the singular seamless energy surface may be a curved and polished faceplate. In this embodiment, a separation between edges of any two adjacent second surfaces (e.g., 934A and 934B, 934C and 934D) may be less than a minimum perceptible contour as defined by the visual acuity of a human eye having better than 20/40 vision at a distance from the singular seamless energy surface 990, the distance being greater than the lesser of: half of a height of the singular seamless energy surface 990, or half of a width of the singular seamless energy surface 990.

In this embodiment, a first aperture 980A has a first field of view on the singular seamless energy surface 990, and a second aperture 980B has a second field of view on the singular seamless energy surface 990, the first and second fields of view overlapping in a first region A. In some embodiments, the system may further include energy inhibiting elements 975A, 975B, 975C, 975D, 975E configured to substantially allow energy to propagate through only one of the first and second apertures 980A, 980B. The energy inhibiting element 975A-975E may include filters, blockers and polarized film, configured to allow different encoding states (+ or −) to pass therethrough. In operation, the energy inhibiting element 975A-975E may further limit propagation of the energy based on different encoding of the energy at different locations, and allowing only one of different encoding states (e.g., + or −, R/G/B) to pass therethrough.

In some embodiments, each of the one or more energy relay elements 930A-930E includes a flexible waveguide configured to provide magnified optics or minified optics. In other embodiments, each of the second surfaces 934A-934E of the one or more energy relay elements 930A-930E can be flat, curved, faceted, or non-uniform.

An energy combiner 940A-940E can be bonded to the minified end of each tapered energy relay 930A-930E at surfaces 932A-932E, respectively. In one embodiment, the energy devices 975A-975E on the leg of the image combiner labeled '−' can be displays, while the energy devices 920A-920E on the other leg labeled '+' can also be displays. In another embodiment, all the energy devices on both '−' and '+' legs of the combiners can be energy sensors. In yet another embodiment, the energy devices on leg '−' of the image combiners can be displays, and the energy devices on leg '+' are energy sensing devices.

In one embodiment, the system further includes additional waveguide elements 960A, 960B configured to substantially alter the direction of energy to propagate through the first and second apertures 980A, 980B, respectively. Although two additional waveguide elements 960A, 960B are shown, it will be appreciated by one skilled in the art that there need only be one additional waveguide element 960 for altering the direction of energy through the apertures 980. In some embodiments, the additional waveguide element 960 includes a dioptric adjustment optics that increases the first FOV, the second FOV, or both the first and second FOV's.

In some embodiments, one may introduce a beam splitter, prism, reflectors or the like in order to produce a high resolution, wide FOV AR experience where the optical path to view the world may be split with an optical device to allow the ability to map and overlay graphics or other content onto the environment without limitation of FOV or resolution. In similar manner, it may be possible to produce a planar, cylindrical, or spherical image surface, with or without image combining and direct polarization to increase the available FOV per eye or aperture, aligned to the optical path that the eye sees, providing extraordinary resolution and FOV as reflected and mapped onto the real world environment. It may be possible to maintain light weight optics leveraging plastic materials or elements exhibiting Anderson Localization phenomena, as well as maintain a small energy surface size by directly minifying the entirety of the display with loose coherent fibers and image conduits and the like.

Figure 10:
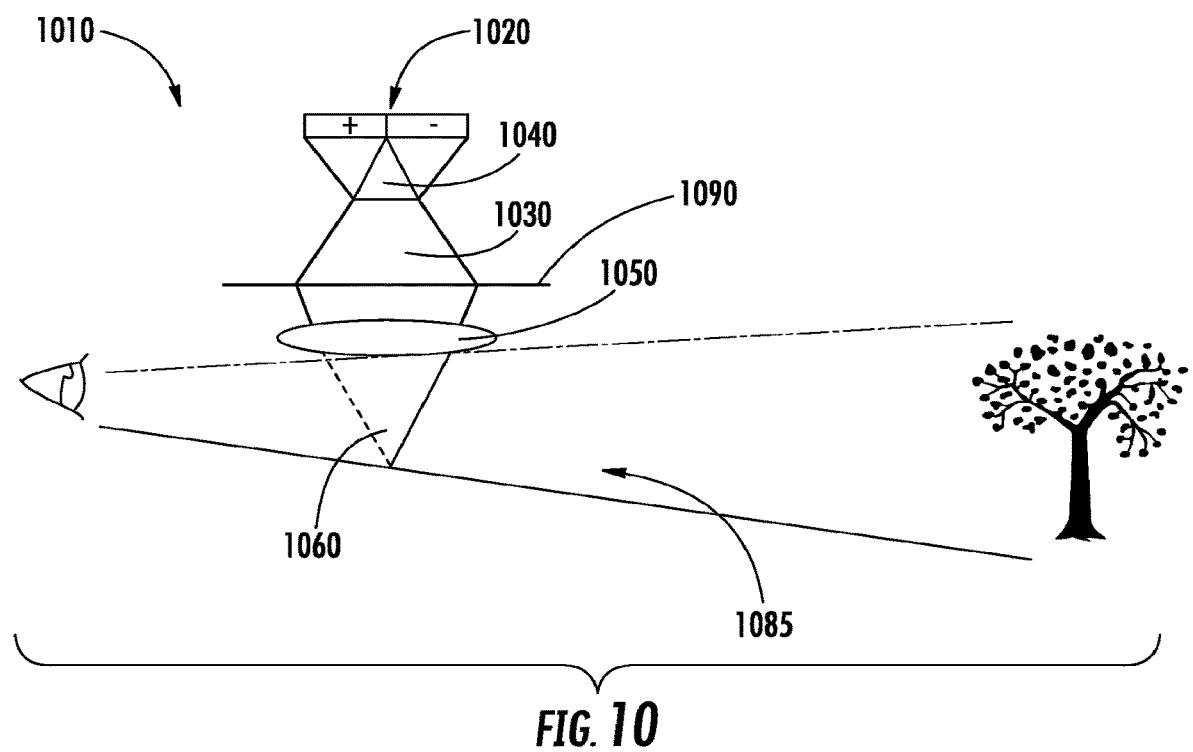
FIG. 10 illustrates an embodiment of a head-mounted display (HMD) system, in accordance with one embodiment of the present disclosure.

In an exemplary version of a HMD system concept, the optical path may be shared between the external environment and a high-resolution, wide FOV display. FIG. 10 shows one such embodiment of a HMD system 1010, where the display includes one or more energy device 1020, connected to one or more energy combiner elements 1040, connected to relay elements 1030, and configured to form a single seamless energy surface 1090 arranged in a perpendicular orientation to be viewable by the reflection in the beam splitter.

In one embodiment, the HMD system 1010 further includes an energy combining element 1060 having first and second input surfaces, the first input surface disposed in energy propagation paths of the single seamless energy surface 1090 and the second input surface disposed in energy propagation paths of additional energy sources 1085.

In some embodiments, the system may include prisms, reflectors, beam-splitters or the like where the reflector/prism may be disposed at a 45-degree angle to the left for the left eye and the right for the right eye, allowing a simplification to the entire design without requiring polarization or image combiners, so that each eye may be treated independently, eliminating overlap between left and right eye fields of view and helping reduce the overall form factor of the design.

In operation, the energy combining element 1060 is capable of combining energy propagating through the first and second input surfaces and output the combined energy through an output surface of the energy combining element 1060. In some embodiments, the energy combining element 1060 can be a polarizing beam splitter, a prism, or a dichoric film. The beam splitter is able to split optical paths at the eye into two or more paths such that a user can view the unobstructed real-world object and an image from the system simultaneously. In these instances, the user may be viewing different optical split percentages between the real-world and the system (e.g., 50/50, 25/75, or variable). The additional energy source 1085 may include at least one of a portion of ambient energy, energy from the one or more energy devices 1020, energy from non-energy devices, or energy outside of the system 1010.

Like above, each of the one or more energy relay elements of FIGS. 7-10 may be fabricated with randomized refractive index variability in the transverse orientation coupled with minimal refractive index variation in the longitudinal orientation, resulting in energy waves having substantially higher transport efficiency along the longitudinal orientation, and spatial localization along the transverse orientation. In other embodiments where the relay is constructed of multicore fiber, the energy waves propagating within each relay element may travel in the longitudinal orientation determined by the alignment of fibers in this orientation.

Figure 11:
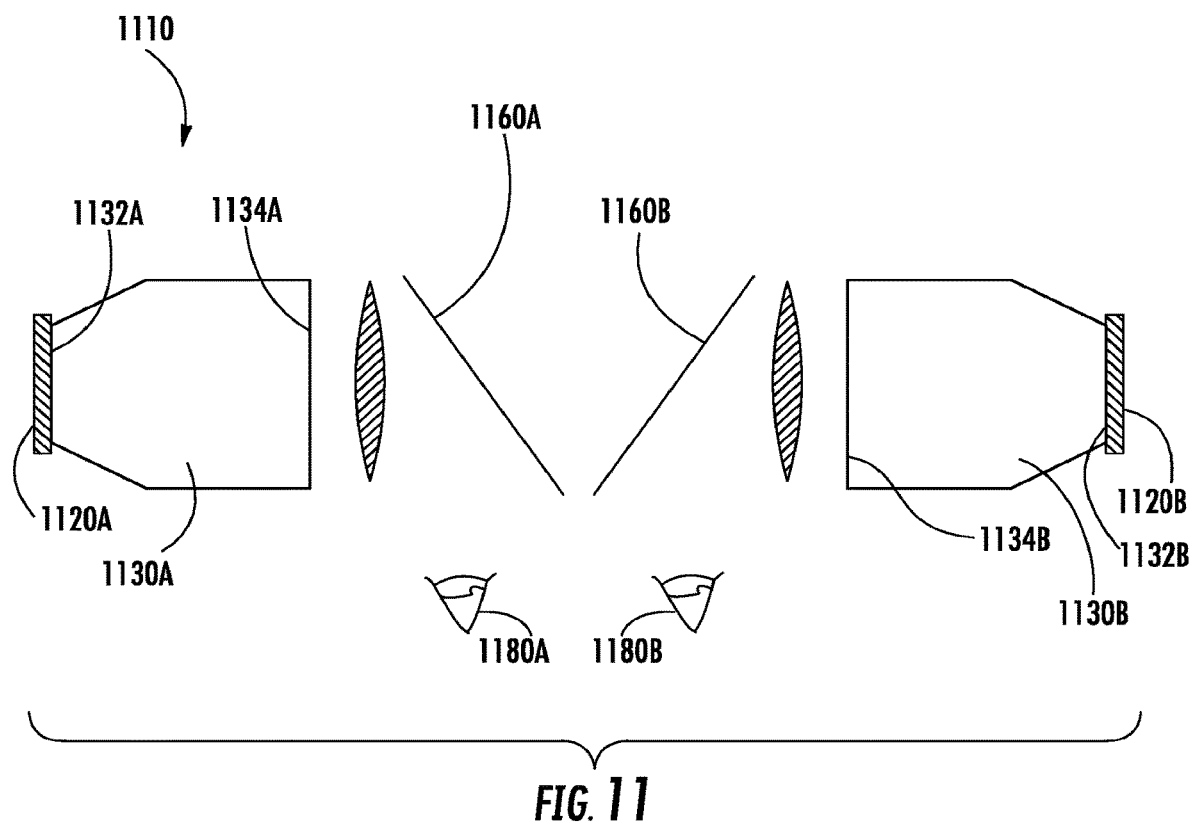
FIG. 11 illustrates an embodiment of a head-mounted display (HMD) system, in accordance with one embodiment of the present disclosure.

FIG. 11 illustrates an embodiment of a HMD system 1110 with a high resolution display mounted to the left and right sides of the device, for the left and right eye, respectively. In one embodiment, the devices 1160A, 1160B are reflectors. The device contains one or more energy devices 1120A, 1120B, and one or more energy relay elements 1130A, 1130B. Each of the energy relay elements 1130A, 1130B includes a first surface 1132A, 1132B and a second surface 1134A, 1134B where the first surface 1132A, 1132B is disposed in energy propagation paths of the one or more energy devices 1120A, 1120B and the second surface 1134A, 1134B of each of the one or more energy relay elements 1130A, 1130B is arranged to form a singular seamless energy surface (not shown in FIG. 11 but similar to that of FIG. 9 as can be appreciated by one of skill in the art). Like above, in this embodiment, a separation between edges of any two adjacent second surfaces can be less than a minimum perceptible contour as defined by the visual acuity of a human eye having better than 20/40 vision at a distance from the singular seamless energy surface, the distance being greater than the lesser of: half of a height of the singular seamless energy surface, or half of a width of the singular seamless energy surface.

In this embodiment, a first aperture 1180A has a first FOV and the second aperture 1180B has a second field of view, the first and second fields of view overlapping in a first region. In one embodiment, the system 1110 further includes an energy inhibiting element (not shown) configured to substantially allow energy to propagate through only one of the first and second apertures 1180. In another embodiment, the system 1110 further includes an energy combining element 1160 having first and second input surfaces, the first input surface disposed in the energy propagation paths of the single seamless energy surface and the second input surface disposed in energy propagation paths of an additional energy source.

In an embodiment, a waveguide element such as a lens array may be introduced in front of each tapered energy relay in order to render a complete light field in a VR or AR headset. This requires $N^2$ higher resolution that may be potentially challenging depending on the market and application. Given the increased data and resolution requirements, leveraging loose coherent optical fibers and minification of the image may be advantageous to optically relay the physical electronics off of the headset and into an accessory device. By leveraging the concept of minifying the energy surface in relation to the pixel size, it may be possible to, provide a first optical fiber taper to minify the display, couple the minified end to a loose coherent fiber with minification ratio 1, couple the alternate end of the loose coherent fiber to the minified end of an optical fiber taper and produce the energy surface with the magnified end with magnification ratio 2 which should be less than the effective inverse minification from ratio 1 in order to maintain a smaller overall energy surface. The loose coherent fibers may be in excess of a meter in length and can be aggregated together to form a singular optical tether to the accessory electronics.

Figure 12:
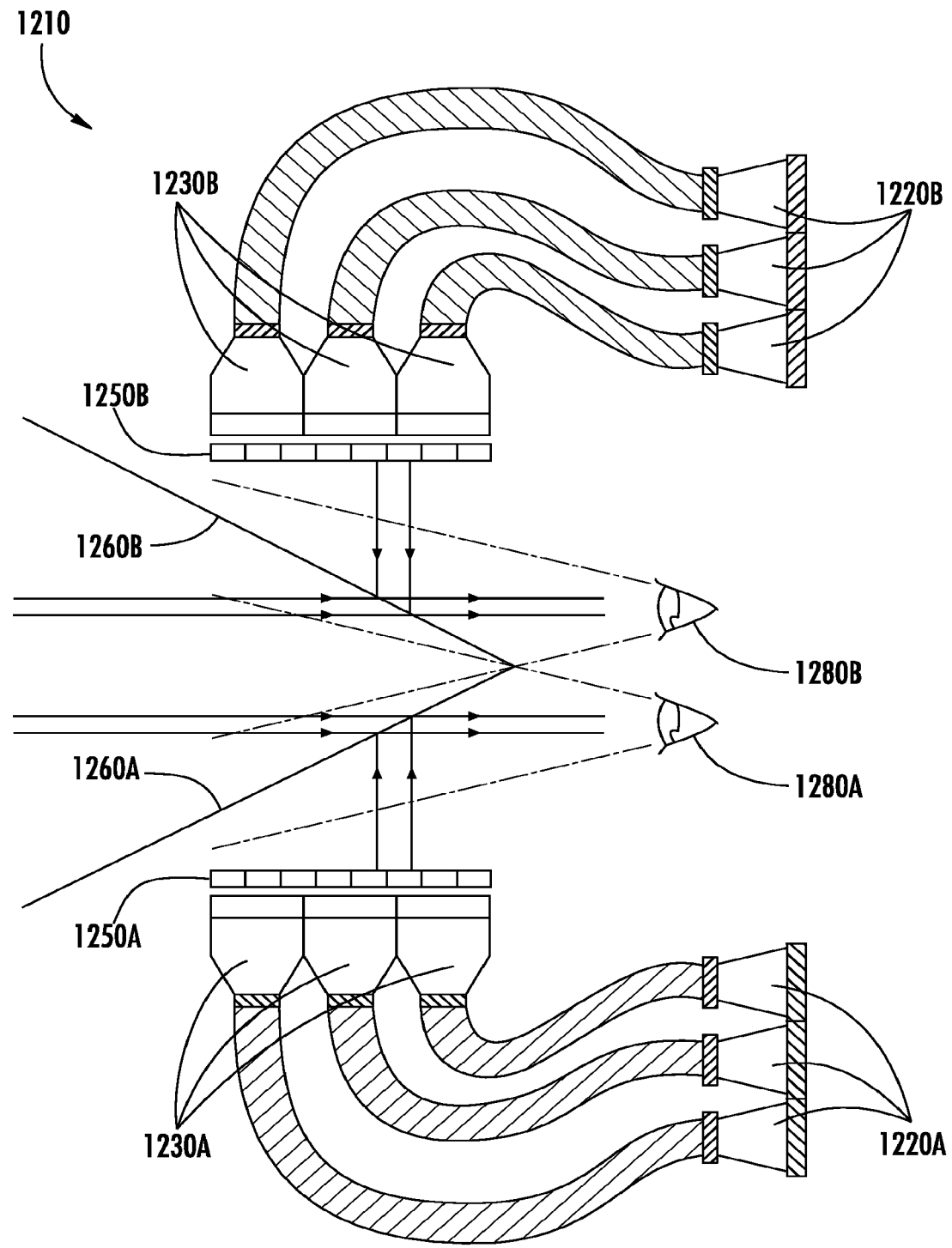
FIG. 12 illustrates an embodiment of a head-mounted display (HMD) system, in accordance with one embodiment of the present disclosure.

FIG. 12 illustrates the addition of a waveguide array into the previously described embodiment where there is a left eye energy surface, and a right eye energy surface, and a right eye reflector and energy surface 1260B and each energy surface is attached to a loose coherent fiber that is offset into an accessory electronics device that contains the additional optical fibers and display components. This implementation can also be leveraged with or without the waveguide array, and for VR or AR to help achieve a more lightweight and pragmatic HMD design.

In one embodiment, the HMD system 1210 includes one or more energy devices 1220A, 1220B, one or more energy relay elements 1230A, 1230B, each having a first surface and a second surface where the first surface is disposed in energy propagation paths of the one or more energy devices 1220A, 1220B similar to those discussed above. In this embodiment, energy may be relayed from the energy devices 1220 to the energy relay elements 1230 via loose coherent optical fibers thereby minimizing the form factor of the HMD design and hardware.

Returning now to FIG. 12, the HMD system 1210 further includes the second surface of each of the one or more energy relay elements 1230 arranged to form a singular seamless energy surface, where a separation between edges of any two adjacent second surfaces is less than a minimum perceptible contour as defined by the visual acuity of a human eye having better than 20/40 vision at a distance from the singular seamless energy surface, the distance being greater than the lesser of: half of a height of the singular seamless energy surface, or half of a width of the singular seamless energy surface similar to that discussed above.

In operation, a first aperture 1280A has a first field of view on a corresponding singular seamless energy surface, and a second aperture 1280B has a second field of view on a corresponding singular seamless energy surface, the first and second fields of view overlapping. The system 1210 further includes an energy inhibiting element (not shown) configured to substantially allow energy to propagate through only one of the first and second apertures 1280. In some embodiments, the system 1210 includes energy combining elements 1260A and 1260B having first and second input surfaces, the first input surface disposed in the energy propagation paths of a single seamless energy surface and the second input surface disposed in energy propagation paths of an additional energy source.

In some embodiments, each of the one or more energy relay elements 1230 of the HMD system 1210 includes a flexible waveguide configured to provide magnified optics or minified optics. In other embodiments, each of the second surfaces of the one or more energy relay elements 1230 can be flat, curved, faceted, or non-uniform. In yet other embodiments, an energy combiner can be placed at the magnified end of each one of the tapered relays 1220A and 1220B, so that two energy devices can be attached (not shown in FIG. 12 but best illustrated in FIG. 9 as can be appreciated by one of skill in the art). For each combiner, both the energy devices can be displays, or both can be energy sensing devices, or one could be a display while the second could be an energy sensing device.

In one embodiment, the system 1210 further includes an additional waveguide element 1250A, 1250B configured to substantially alter the direction of energy to propagate through the first aperture 1280A, the second aperture 1280B, or both the first and second apertures 1280. In these instances, the additional waveguide element includes a dioptric adjustment optics that increases the first field of view, the second field of view, or both the first and second fields of view.

In one embodiment, each of the one or more energy relay elements 1220 and 1230 may be fabricated with randomized refractive index variability in the transverse orientation coupled with minimal refractive index variation in the longitudinal orientation, resulting in energy waves having substantially higher transport efficiency along the longitudinal orientation, and spatial localization along the transverse orientation. In other embodiments where the relay is constructed of multicore fiber, the energy waves propagating within each relay element may travel in the longitudinal orientation determined by the alignment of fibers in this orientation.

In one embodiment, the HMD system 1210 may further include an energy modulation element 1250A, 1250B disposed between the energy combining element and the single seamless energy surface, the energy modulation element 1250 configured to modulate energy passing therethrough.

In some embodiments, the HMD systems disclosed herein further includes an array of energy waveguides configured to direct energy therethrough along the energy propagation paths, where the energy waveguides of the array are located at different spatial coordinates, and each energy waveguide directs energy from the respective spatial coordinate to the energy propagation paths along different directions according to a 4D plenoptic function.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A system comprising:
   one or more energy devices;
   one or more energy relay elements, each having a first surface and a second surface, wherein the first surface is disposed in energy propagation paths of the one or more energy devices;
   wherein the second surface of each of the one or more energy relay elements is arranged to form a singular seamless energy surface;
   wherein a separation between edges of any two adjacent second surfaces is less than a minimum perceptible contour as defined by the visual acuity of a human eye having better than 20/40 vision at a distance from the singular seamless energy surface, the distance being greater than the lesser of: half of a height of the singular seamless energy surface, or half of a width of the singular seamless energy surface; and
   wherein a first aperture has a first field of view on the singular seamless energy surface, and a second aperture has a second field of view on the singular seamless energy surface, the first and second fields of view overlapping in a first region.

2. The system of claim 1, further comprising an energy inhibiting element configured to substantially allow energy to propagate through only one of the first and second apertures.

3. The system of claim 1, wherein each of the one or more energy relay elements includes a flexible waveguide configured to provide magnified optics or minified optics.

4. The system of claim 1, wherein each of the second surfaces of the one or more energy relay elements can be flat, curved, faceted, or non-uniform.

5. The system of claim 1, wherein the one or more energy devices include a first energy device and a second energy device, wherein both of the first energy device and the second energy device include displays, and wherein the system further comprises an energy combining element configured to relay energy between each of the first energy device and the second energy device, and the first surface of the energy relay element.

6. The system of claim 1, wherein the one or more energy devices include a first energy device and a second energy device, wherein both of the first energy device and the second energy device include energy sensing devices, and wherein the system further comprises an energy combining element configured to relay energy between each of the first energy device and the second energy device, and the first surface of the energy relay element.

7. The system of claim 1, wherein the one or more energy devices include a first energy device and a second energy device, wherein the first energy device includes a display and the second energy device include an energy sensing device, and wherein the system further comprises an energy combining element configured to relay energy between each of the first energy device and the second energy device, and the first surface of the energy relay element.

8. The system of claim 1, further comprising an additional waveguide element configured to substantially alter the direction of energy to propagate through the first aperture, the second aperture, or both the first and second apertures.

9. The system of claim 8, wherein the additional waveguide element includes a dioptric adjustment optics that increases the first field of view, the second field of view, or both the first and second fields of view.

10. The system of claim 1, further comprising an energy combining element having first and second input surfaces, the first input surface disposed in energy propagation paths of the single seamless energy surface and the second input surface disposed in energy propagation paths of an additional energy source.

11. The system of claim 10, wherein the energy combining element is configured to combine energy propagating through the first and second input surfaces and output the combined energy through an output surface of the energy combining element.

12. The system of claim 10, wherein the energy combining element can be a polarizing beam splitter, a prism or a dichoric film.

13. The system of claim 10, wherein the additional energy source includes at least one of a portion of ambient energy, energy from the one or more energy devices, energy from non-energy devices, and energy outside of the system.

14. The system of claim 1, wherein each of the one or more energy relay elements includes first and second structures, the first structure having a first refractive index and a first engineered property, the second structure having a second refractive index and a second engineered property, and wherein each of the one or more energy relay elements includes randomized refractive index variability in the transverse orientation coupled with minimal refractive index variation in the longitudinal orientation, resulting in energy waves having substantially higher transport efficiency along the longitudinal orientation, and spatial localization along the transverse orientation.

15. A system comprising:
   first energy device and second energy device spaced from each other, wherein each of the first energy device and the second energy device includes a first surface and a second surface, respectively;
   first energy relay element and second energy relay element spaced from each other, wherein each of the first energy relay element and the second energy relay element includes a first surface and a second surface, respectively;
   wherein the first energy device is coupled to the first energy relay element through a first energy combining element;
   wherein the second energy device is coupled to the second energy relay element through a second energy combining element;
   wherein the first energy relay element is configured to propagate energy between the first surface of the first energy device and the second surface of the first relay element; and
   wherein the second energy relay element is configured to propagate the energy between the first surface of the second energy device and the second surface of the second relay element.

16. The system of claim 15, wherein each of the first energy combining element and the second energy combining element can be a polarizing beam splitter, a prism or a dichoric film.

17. The system of claim 15, further comprising a first display device disposed on the first energy combining element and a second display device disposed on the second energy combining element.

18. The system of claim 15, further comprising a first sensor disposed on the first energy combining element and a second sensor disposed on the second energy combining element.

19. The system of claim 15, wherein the first energy combining element is configured to combine the energy from the first energy device and energy from an additional source external to the system.

20. The system of claim 15, wherein the second energy combining element is configured to combine the energy from the second energy device and energy from an additional source external to the system.

21. A system comprising:
one or more energy devices;
one or more energy relay elements, each having a first surface and a second surface, wherein the first surface is disposed in energy propagation paths of the one or more energy devices;
wherein the second surface of each of the one or more energy relay elements is arranged to form a singular seamless energy surface;
wherein a separation between edges of any two adjacent second surfaces is less than a minimum perceptible contour as defined by the visual acuity of a human eye having better than 20/40 vision at a distance from the singular seamless energy surface, the distance being greater than the lesser of: half of a height of the singular seamless energy surface, or half of a width of the singular seamless energy surface;
wherein a first aperture has a first field of view on the singular seamless energy surface, and a second aperture has a second field of view on the singular seamless energy surface, the first and second fields of view overlapping in a first region; and
an energy combining element having first and second input surfaces, the first input surface disposed in the energy propagation paths of the single seamless energy surface and the second input surface disposed in energy propagation paths of an additional energy source.

22. The system of claim 21, further comprising an energy inhibiting element configured to substantially allows energy to propagate through only one of the first and second apertures.

23. The system of claim 21, wherein each of the one or more energy relay elements includes a flexible waveguide configured to provide magnified optics or minified optics.

24. The system of claim 21, wherein each of the second surfaces of the one or more energy relay elements can be flat, curved, faceted, or non-uniform.

25. The system of claim 21, wherein the one or more energy devices include a first energy device and a second energy device, wherein both of the first energy device and the second energy device include displays, and wherein the system further comprises an energy combining element configured to relay energy between each of the first energy device and the second energy device, and the first surface of the energy relay element.

26. The system of claim 21, wherein the one or more energy devices include a first energy device and a second energy device, wherein both of the first energy device and the second energy device include energy sensing devices, and wherein the system further comprises an energy combining element configured to relay energy between each of the first energy device and the second energy device, and the first surface of the energy relay element.

27. The system of claim 21, wherein the one or more energy devices include a first energy device and a second energy device, wherein the first energy device includes a display and the second energy device include an energy sensing device, and wherein the system further comprises an energy combining element configured to relay energy between each of the first energy device and the second energy device, and the first surface of the energy relay element.

28. The system of claim 21, further comprising an additional waveguide element configured to substantially alter the direction of energy to propagate through the first aperture, the second aperture, or both the first and second apertures.

29. The system of claim 28, wherein the additional waveguide element includes a dioptric adjustment optics that increases the first field of view, the second field of view, or both the first and second fields of view.

30. The system of claim 21, wherein the energy combining element is configured to combine energy propagating through the first and second input surfaces and output the combined energy through an output surface of the energy combining element.

31. The system of claim 21, wherein the energy combining element can be a polarizing beam splitter, a prism or a dichoric film.

32. The system of claim 21, wherein the additional energy source includes at least one of a portion of ambient energy, energy from the one or more energy devices, energy from non-energy devices, and energy outside of the system.

33. The system of claim 21, wherein each of the one or more energy relay elements includes first and second structures, the first structure having a first refractive index and a first engineered property, the second structure having a second refractive index and a second engineered property, and wherein each of the one or more energy relay elements includes randomized refractive index variability in the transverse orientation coupled with minimal refractive index variation in the longitudinal orientation, resulting in energy waves having substantially higher transport efficiency along the longitudinal orientation, and spatial localization along the transverse orientation.

34. The system of claim 21, further comprising an array of energy waveguides configured to direct energy therethrough along the energy propagation paths, wherein the energy waveguides of the array are located at different spatial coordinates, and each energy waveguide directs energy from the respective spatial coordinate to the energy propagation paths along different directions according to a 4D plenoptic function.

35. The system of claim 21, further comprising an energy modulation element disposed between the energy combining element and the single seamless energy surface, the energy modulation element configured to modulate energy passing therethrough.

* * * * *

UNITED STATES PATENT AND TRADEMARK OFFICE
CERTIFICATE OF CORRECTION

PATENT NO. : 10,551,628 B2  
APPLICATION NO. : 16/063976  
DATED : February 4, 2020  
INVENTOR(S) : Karafin et al.

Page 1 of 1

It is certified that error appears in the above-identified patent and that said Letters Patent is hereby corrected as shown below:

On the Title Page

Item (54) and in the Specification, Column 1, Line 4, add the word "DISPLAYS" to the end of the title.

Signed and Sealed this
Nineteenth Day of May, 2020

Andrei Iancu
*Director of the United States Patent and Trademark Office*